Nov. 28, 1961    J. W. FRATZKE    3,010,194
APPARATUS FOR COVERING ROLLS WITH FLEXIBLE TUBING
Filed Nov. 6, 1958
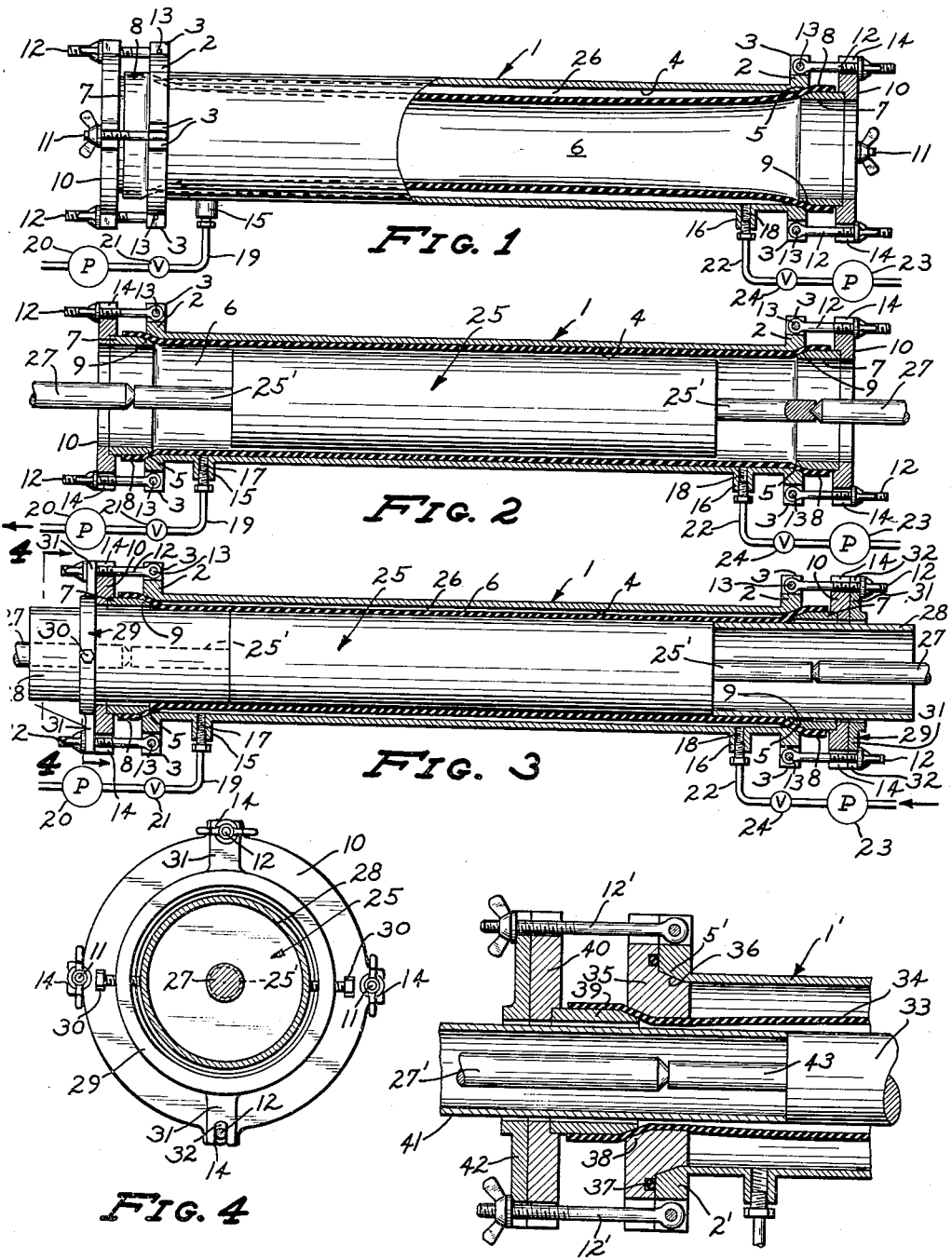
INVENTOR.
JOHN W. FRATZKE
BY
Merchant & Merchant
ATTORNEYS

United States Patent Office 3,010,194
Patented Nov. 28, 1961

3,010,194
APPARATUS FOR COVERING ROLLS WITH FLEXIBLE TUBING
John W. Fratzke, Minneapolis, Minn., assignor to Ruberol Coverings, Inc., Minneapolis, Minn., a corporation of Minnesota
Filed Nov. 6, 1958, Ser. No. 772,289
4 Claims. (Cl. 29—235)

My invention relates generally to the art of covering rigid core elements with elastic cover elements, and more particularly to a method of apparatus for applying elastic rubber or plastic tubular covers to rigid core elements such as shafts, mandrels, and the like.

Heretofore, when the elastic covering of a roll, shaft, or the like has been unduly worn, it has been necessary to ship the same to a factory which manufactures the same, for recovering or replacement. Inasmuch as many such rolls are heavy and cumbersome, shipping costs are high, and the delays involved in shipping to and from distant points, cause machines using the rolls to be rendered inoperative for such lengths of time as to create a severe economic problem to the user. In the case of rubber-covered rolls, the rubber covering is usually applied to a metal core, such as a shaft or mandrel, with the use of a suitable cement, and thereafter vulcanized to the shaft to insure against slipping in use. After vulcanizing, the complete roll is placed in a lathe and the surface of the covering machined to provide proper balance and concentricity. Obviously, this procedure consumes considerable time and effort, thus adding to the delay and expense. Moreover, the cost of maintaining a large inventory of replacement rolls is, in most instances, prohibitive.

An important object of my invention is the provision of a novel method of, and apparatus for, covering such cores, shafts or mandrels with elastic material, which, due to the relatively low cost involved, can be utilized by so-called small operators, or by the users of such rolls and the like, themselves.

Another object of my invention is the provision of a method and apparatus as set forth, by means of which a core may be equipped with an elastic cover in a minimum of time and with a minimum of effort.

Another object of my invention is the provision of a method of applying tubular elastic covering to rigid cores which eliminates the necessity of utilizing heat to create the necessary bond between the cover and core.

Still another object of my invention is the provision of a method and apparatus as set forth which, when utilized to apply an elastic covering to a core, the covering needs no machining to make the same true with the core and will not slip on the core during subsequent use.

To the above ends, my novel method involves the insertion of a rigid core element into an elastic tubular cover element, with a layer of adhesive material therebetween; and the application of fluid under pressure greater than atmospheric pressure, to the exterior surface of the elastic cover element, to cause the adhesive layer to create a firm bond between the core element and the overlying cover element, said pressure being sufficient to smooth out any unevenness in thickness of said layer of adhesive material.

Another object of my invention is the provision of apparatus as set forth which is simple and inexpensive to produce, which is capable of use with cover and core elements of various sizes, and which is highly efficient in operation and extremely durable. The above, and further highly important objects and advantages of my invention will become apparent from the following detailed specification, appended claims and attached drawing.

Referring to the drawing, which illustrates the invention, and in which like reference characters indicate like parts throughout the several views:

FIG. 1 is a view partly in side elevation and partly diagrammatic, of a preferred form of the apparatus of my invention, some parts being broken away and some parts shown in section;

FIG. 2 is a view corresponding to FIG. 1 but showing my novel apparatus in axial section, and illustrating one of the steps of my novel method.

FIG. 3 is a view corresponding to FIG. 2 but showing additional portions of my novel apparatus;

FIG. 4 is an enlarged view partly in end elevation and partly in transverse section, taken substantially on the line 4—4 of FIG. 3; and FIG. 5 is an enlarged fragmentary view in axial section of a modified form of the structure of FIGS. 1–4.

In the preferred embodiment of the apparatus of my invention, illustrated in FIGS. 1–4, an elongated tubular housing 1 is shown as being provided at its opposite ends with circumferential flanges 2 that are formed to provide circumferentially spaced pairs of radially outwardly projecting gears 3. The inner cylindrical surface 4 of the housing 1 is beveled at its opposite ends to provide inwardly tapering annular seats 5 which are adapted to make sealing engagement with axially spaced portions of a tubular cover element 6 which will be hereinafter more fully described.

A pair of sealing rings 7 are adapted to be inserted one each into an opposite end portion of the tubular cover element 6 to circumferentially expand said end portions, as indicated at 8, said sealing rings 7 each being provided with inwardly tapered inner ends 9, the taper of which corresponds substantially to the taper of the annular seats 5. The tapered portions 9 of the sealing ring 7 are utilized to compress the adjacent portions of the tubular cover element 6 against the annular seats 5 whereby sealing contact is made between the tubular element 6 and the opposite end portions of the housing 1. The sealing rings 7 are releasably locked in place by lock rings 10 and diametrically opposed pairs of wing nut-equipped clamping bolts 11 and 12, the inner ends of the clamping bolts being mounted for swinging movements, by means of pivot pins 13, between each pair of said ears 3. Preferably, the lock rings 10 are provided with radially outwardly opening slots 14 for reception of their respective clamping bolts 11 and 12, whereby the lock rings 10 may be quickly and easily applied to the sealing rings 7 and removed therefrom, without the necessity of completely removing the wing nuts from their respective clamping bolts 11 and 12.

Preferably, and as shown, the elongated tubular housing 1 is formed with a pair of radially extending bosses 15 and 16 which define fluid passages 17 and 18 respectively, said passages communicating with the interior of the housing 1 intermediate the tapered end portions thereof. A fluid conduit 19 is secured at one end to the boss 15, and is connected to a suction pump 20, a shut-off valve 21 being interposed in the conduit 19 between the passage 17 and the pump 20. A similar conduit 22 is connected at one end to the boss 16 in communication with the passage 18 and is connected to a fluid pressure pump 23, a shut-off valve 24 being interposed in the conduit 22 between the passage 18 and pump 23. It will be appreciated that, if desired, the tubular housing may be made with but a single one of the passages 17 or 18, in which event a 3-way valve may be substituted for the shut-off valves 21 and 24, and suitably connected to the pumps 20 and 23 whereby selective communication may be had between the pumps and the interior of the housing 1.

In the drawings, a rigid cylindrical core element is indicated at 25, the same being in the nature of a roll or mandrel journalled or otherwise mounted on a shaft 25' which extends axially outwardly from the opposite ends thereof. The tubular cover element 6, with which the core element 25 is to be covered, is made from rubber, plastics or the like, and when made from rubber has a normal internal diameter preferably slightly less than that of the core element 25. Assuming that the cover element 6 is of rubber, the method of applying the cover element 6 to the core element 25 is as follows:

The cover element 6, having been cut to the proper length, is inserted into the housing 1, and the sealing rings 7 inserted in the opposite ends thereof, as shown in FIG. 1. The lock rings 10 are then applied to the outer ends of the sealing rings 7, and the clamping bolts 11 and 12 swung into place in the slots 14, after which the wing nuts on the clamping bolts are tightened to effect a proper seal between the end portions of the cover element 6 and the annular seats 5 of the housing 1. With the valve 24 closed, and the valve 21 opened, the suction pump 20 is then energized to evacuate air from the annular chamber defined by the inner wall surface 4 of the housing 1 and the tubular cover element 6, said chamber being indicated at 26, the differential in pressure between the interior of the cover element 6 and the chamber 4 causing the elastic cover element 6 to expand circumferentially, as shown in FIG. 2. In practice, I have found that, by placing the fluid passage 17 in close proximity to one end of the housing 1, the taper of the adjacent seat 5 tends to prevent the portion of the cover element 6 overlying the passage 17 from being pulled into sealing relationship therewith until substantially all of the cover element 6 has expanded into contact with the inner wall 4 of the housing 1. As will hereinafter become apparent, this problem arises only when the cover element 6 is of a diameter which enables the same to engage the inner wall surface 4 when the cover element is expanded to the proper extent. When the cover element 6 has been circumferentially expanded to the desired dimension, a coating of suitable adhesive is applied to the inner surface thereof, and a similar coating of adhesive is applied to the outer cylindrical surface of the core element 25. The core element 25, supported by a pair of supporting arms 27 engaging opposite ends of the shaft 25′, is inserted axially into the cover element 6 and positioned as shown in FIG. 2. The pump 20 is de-energized and the valve 21 closed, after which the valve 24 is opened and the pump 23 energized to introduce fluid, such as air, under pressure to the chamber 26 through the conduit 22 and passage 18. As soon as the air is admitted to the chamber 26, the elastic cover element 6 will contract toward its normal diameter, coming into contact with the core element 25. Operation of the pump 23 is continued until the chamber 26 is under a suitable pressure greater than atmospheric pressure whereby the cover element 6 is urged into contact with the underlying core element 25 with such force as to squeeze out any air bubbles which may have formed therebetween, and to iron out any unevennesses in the thickness of the combined layers of adhesive material. After a suitable time interval, usually but a few minutes, the pump 23 is de-energized and the pressure within the chamber 26 relieved. The locking rings 10 and sealing rings 7 are then removed from the opposite ends of the housing 1, and the core element 25, with the cover element 6 properly adhered thereto, removed from the housing 1. The end portions of the cover element 6, axially outwardly of the core element 25 are then cut away, and the newly covered core or roll 25 is ready for use. By exerting fluid pressure evenly over the entire core covering area of the cover element 6, as above described, the finished roll is then conditioned to be put into operation without the necessity of further truing, it being assumed of course that the wall thickness of the cover element 6 is uniform throughout its length before the same is applied to the core.

In the event that the core element 25 is appreciably shorter than the housing 1, as indicated in FIGURES 2 and 3, I provide a pair of rigid tubular members 28 having an outer diameter equal to that of the core element 25, and each insertable into an opposite end of the housing 1 after the cover element 6 has been expanded. The tubular supporting members 28 are mounted in annular holders 29, by means of two or more circumferentially spaced set screws or the like 30. Each of the annular holders 29 is provided with diametrically opposed radially outwardly projecting lugs 31 having slots or notches 32 therein for reception of the clamping bolts 12, said clamping bolts 12 being slightly longer than the clamping bolts 11. When the tubular supporting members 28 are inserted, as shown in FIG. 3, the clamping bolts 12 are loosened and pivotally moved out of the grooves or slots 14 in the locking rings 10, the clamping bolts 11 being sufficient to hold the locking rings 10 in place. The annular holders 29 are then mounted on the tubular supporting member 28 with the notches or slots 32 aligned with adjacent notches or grooves 14, and the clamping bolts 12 replaced and the wing nuts thereof tightened, as shown in FIGS. 3 and 4. With the tubular supporting member 28 in abutting relation with opposite ends of the core element 25, the set screws 30 are tightened whereby the tubular supporting members 28 are securely held against axially outward movement. Then, when fluid under pressure is introduced to the chamber 26, collapse of the cover element 6 axially outwardly of the ends of the core element 25, is effectively prevented.

In the modified arrangement illustrated in FIG. 5, the tubular housing, indicated by the reference character 1′ is identical to the housing 1, a core element 33 being of considerably smaller diameter than the core element 25 of FIGS. 1–4. When covering such a smaller diameter core element 33 with a correspondingly smaller diameter cover element, indicated at 34, I provide a bushing 35 having an inwardly tapering annular portion 36 which seats against the annular seat 5′ of the housing 1′. An air tight seal between the end flange 2′ and the bushing 35 is effected by a conventional O-ring or the like 37. The bushing 35 is formed to provide an annular inwardly tapering seat 38 which cooperates with a sealing ring 39 which is identical with the sealing rings 7 except as to dimension, to seal the opposite ends of the cover element 34 in the manner above described with reference to the structure of FIGS. 1–4. A lock ring 40, tubular supporting member 41, and annular holder 42, similar to the lock rings 10, tubular members 28 and annular holders 29 respectively, are held in place by clamping bolts 12′. The shaft 43 of the core element 33 is engaged by supporting arms 27′, one of which is shown. Although I have shown but a single end of the tubular housing 1′, it will be understood that the opposite end thereof is identical to the end shown, in the manner set forth with respect to FIGS. 1–4. In the arrangement illustrated in FIG. 5, it will be noted that the diameter of the housing 1′, being considerably greater than that of the core element 33 and cover element 34, the amount of circumferential expansion of the cover element 34 necessary to fully admit the core element 33 does not necessarily cause the outer surface of the cover element 34 to make contact with the inner circumferential surface of the housing 1′. It is only necessary that the cover element 34, when normally of a slightly smaller diameter than the core element 33, be expanded sufficiently to permit insertion of the core element 33. Otherwise, the covering of the core element 33 by the cover elements 34 is accomplished in the same manner as that set forth in connection with FIGS. 1–4.

It will be appreciated that it is usually necessary to expand the cover element to permit free insertion of the core element when sticky or tacky adhesives are used to bind the same together. However, adhesives are obtainable which permit sliding contact of the core element with respect to the cover element and which require a definite given pressure to effect a secure bond between the elements. When such adhesives are used, it is not necessary to expand the cover element to the extent necessary when tacky adhesives are used. In fact, the normal inner diameter of the cover element may be such that the core element can be inserted thereinto without expansion of the cover element, in which case the operation of the suction pump 20 to decrease pressure in the annular chamber 26, is eliminated. It is then only necessary to operate the pressure pump 23 to introduce air under pressure to the chamber 26 sufficiently to cause circumferential contraction of the cover element and press the same against the core element with sufficient force to effect the bond therebetween. This practice is utilized when the cover element is made from material other than rubber, such as resilient plastics and the like, the small degree of contraction of the cover element due to the air pressure within the chamber being compensated for by a very slight elongation of the tubular cover element, such elongation being negligible, and occurring axially outwardly of the opposite ends of the core element.

While I have shown and described the various steps of my novel method and a commercial embodiment of apparatus for carrying out the various steps of my novel method, together with a modified form which my apparatus may take, it will be understood that the same is capable of further modification without departure from the spirit and scope of the invention, as defined in the claims.

What I claim is:

1. Apparatus for mounting an elastic tubular cover on a rigid core, said apparatus comprising, elongated tubular housing means including an elongated tubular housing section having radially outwardly projecting circumferential flanges at its opposite ends and a pair of annular end wall elements one each abutting a different one of said flanges, said housing means being adapted for reception of an elastic tubular cover, said end wall elements defining annular seats, a pair of sealing rings having annular surface portions corresponding to said annular seats, said sealing rings being adapted to be inserted into said tubular cover when said cover is received in said housing means to expand the portions of said tubular cover engaged thereby into sealing engagement with said seats, and means for releasably clamping said sealing rings in sealing engagement with said cover, said housing having passage means communicating with the interior thereof and adapted to be connected to a source of fluid under pressure.

2. Apparatus for mounting an elastic tubular cover on a rigid core, said apparatus comprising, an elongated housing having openings at its opposite ends for reception of an elastic tubular cover element, said opening defining annular seats tapering inwardly from opposite ends of said housing for engagement with axially spaced portions of said cover element, a pair of sealing rings having annular surface portions corresponding to said annular seats and being inwardly tapered at substantially the same degree as said seats, said rings being adapted to be inserted into said tubular cover and expand the portions of said cover engaged thereby into sealing engagement with said annular seats, and means for releasably clamping said sealing rings in sealing engagement with said cover element, said housing having passage means communicating with the interior of the housing and adapted to be connected to a source of fluid under pressure, at least one of said rings having an internal diameter sufficiently large to permit free movement of a core element therethrough.

3. Apparatus for mounting an elastic tubular cover on a rigid core element, said apparatus comprising, an elongated housing having openings at its opposite ends for reception of an elastic tubular cover element, said opening defining annular seats for engagement with axially spaced portions of said cover element, a pair of sealing rings having annular surface portions corresponding to said annular seats, said rings being adapted to be inserted into said tubular cover and expand the portions of said cover engaged thereby into sealing engagement with said annular seats, means for releasably clamping said sealing rings in sealing engagement with said cover element, said housing having passage means communication with the interior of the housing and adapted to be connected to a source of fluid under pressure, at least one of said rings having an internal diameter sufficiently large to permit free movement of a core element therethrough, means for supporting said tubular cover element axially outwardly of the ends of a rigid core element received within the cover element, said last-mentioned means comprising a pair of tubular members of substantially equal diameter to that of said core element, and means for releasably locking said tubular members in opposite end portions of said housing in abutting relationship with the opposite ends of said core element, whereby, when fluid under pressure is introduced to the interior of said housing through said passage means, said tubular members will support the portions of said tubular cover element axially outwardly of the core element against radially inward collapse.

4. Apparatus for mounting an elastic tubular cover on a rigid core element, said apparatus comprising, an elongated housing having openings at its opposite ends for reception of an elastic tubular cover element, said openings defining annular seats for engagement with axially spaced portions of said cover element, means adapted to be inserted into said tubular cover and expand the portions of said cover engaged thereby into sealing engagement with said annular seats, one of said means comprising a sealing ring, means for releasably clamping said sealing means in sealing engagement with said cover element, said housing having passage means communicating with the interior of the housing and adapted to be connected to a source of fluid under pressure, said ring having an internal diameter sufficiently large to permit free movement of a core element therethrough, a tubular member for supporting said tubular cover element axially outwardly of one end of a rigid core element received within the cover element, said tubular element being of substantially equal diameter to that of said core element, and means for releasably locking said tubular member in an adjacent end portion of said housing in abutting relationship with the adjacent end of said core element, whereby, when fluid under pressure is introduced into the interior of said housing through said passage means, said tubular member will support the portion of said tubular cover element axially outwardly of the core element against radially inward collapse.

References Cited in the file of this patent
UNITED STATES PATENTS

| 2,201,706 | Sukohl | May 21, 1940 |
| 2,312,993 | Stephens | Mar. 2, 1943 |
| 2,570,259 | McKinley | Oct. 9, 1951 |
| 2,698,458 | Keach | Jan. 4, 1955 |